US005993083A

United States Patent [19]

Tsuzawa

[11] Patent Number: 5,993,083

[45] Date of Patent: Nov. 30, 1999

[54] METHOD AND DEVICE FOR DISTRIBUTING SHEETS OF LIGHT-SENSITIVE MATERIAL

[75] Inventor: Yoshiyuki Tsuzawa, Kanagawa, Japan

[73] Assignee: Fuji Photo Film Co., Ltd., Kanagawa, Japan

[21] Appl. No.: 09/120,176

[22] Filed: Jul. 22, 1998

[30] Foreign Application Priority Data

| | | | |
|---|---|---|---|
| Jul. 23, 1997 | [JP] | Japan | 9-197048 |
| Jul. 23, 1997 | [JP] | Japan | 9-197049 |

[51] Int. Cl.[6] .............................. G03D 3/08; G03B 27/32

[52] U.S. Cl. ............................ 396/612; 355/27; 271/302; 271/298

[58] Field of Search .................................... 396/612, 620, 396/617; 355/27–29; 209/539, 552, 563, 564, 900, 560; 198/358, 890; 271/184–186, 225, 298–300, 302

[56] References Cited

U.S. PATENT DOCUMENTS

| | | | |
|---|---|---|---|
| 4,126,391 | 11/1978 | Nishimoto | 355/27 |
| 4,132,313 | 1/1979 | Kolosov | 271/298 |
| 5,374,972 | 12/1994 | Kakane et al. | 396/612 |
| 5,407,190 | 4/1995 | Hehn | 271/225 |
| 5,430,520 | 7/1995 | Toki et al. | 396/612 |
| 5,618,036 | 4/1997 | Edwards et al. | 271/299 |
| 5,675,836 | 10/1997 | Matsumoto | 396/612 |

*Primary Examiner*—D. Rutledge
*Attorney, Agent, or Firm*—Birch, Stewart, Kolasch & Birch, LLP

[57] ABSTRACT

In the improved method of distributing sheets of light-sensitive material for use in an image recording apparatus, the sheets of light-sensitive material are distributed in a lateral direction perpendicular to their transport through a developing machine to form a plurality of rows. The method uses two distributing units that lift the sheets of light-sensitive material and transport the sheets in the lateral direction. The two distributing units are alternately put into action to distribute the sheets of light-sensitive material into a plurality of rows. The improved distributing device comprises two lift units, a substrate having guide members, two paddle plates, a spring and a motor. Employing a short pathlength, the method is capable of distributing individual sheets of light-sensitive material into two or three rows, practically keeping pace with rapid print production (imagewise exposure) such as processing one print every two seconds. The device of the invention for implementing this method is small in size and features a simple and low-cost layout.

6 Claims, 7 Drawing Sheets

METHOD AND DEVICE FOR DISTRIBUTING SHEETS OF LIGHT-SENSITIVE MATERIAL

BACKGROUND OF THE INVENTION

This invention relates to the technical field of a method and a device for use in an image recording apparatus to distribute sheets of light-sensitive material in a lateral direction perpendicular to their transport to form a plurality of rows that are fed into a developing machine after a latent image was formed on the sheets by exposure.

Heretofore, the image recorded on photographic films such as negatives and reversals (which are hereunder referred to simply as "films") has been commonly printed on light-sensitive materials such as photographic paper by means of direct (analog) exposure, in which projected light from the film is allowed to be incident on the light-sensitive material to achieve its areal exposure.

A new technology has recently been introduced and this is a printer that relies upon digital exposure. Briefly, the image recorded on a film is read photoelectrically, converted to a digital signal and subjected to various image processing operations to produce image data for recording purposes; recording light that has been modulated in accordance with the image data is used to scan and expose a light-sensitive material to record a latent image, which is subsequently developed and output as a print (photograph). The printer operating on this principle has been commercialized as a digital photoprinter.

In the digital photoprinter, the image on a film is read photoelectrically and gradation correction and other operations are performed by subsequent image (signal) processing to determine exposing conditions. Hence, the digital photoprinter has many capabilities in image processing such as editing of printed images by, for example, assembling a plurality of images or splitting a single image into plural images, as well as color/density adjustment and edge enhancement; as a result, prints can be output after various image processing operations have been performed in accordance with specific uses. In addition, the data on a printed image can be supplied into a computer or the like and stored in recording media such as a floppy disk.

A further advantage of the digital photoprinter is that compared to the prints produced by the conventional method of direct exposure, those which are output by the digital photoprinter have better image quality in such aspects as resolution and color/density reproduction.

Having these features, the digital photoprinter is basically composed of an input machine having a scanner (image reader) and an image processor and an output machine having both an exposing device and a developing device.

In the scanner, the projected light carrying the image recorded on a film is read photoelectrically with an image sensor such as a CCD sensor and sent to the image processor as data for the image on the film (i.e., the image data signal). In the image processor, the received image data is subjected to specified image processing operations and the resulting output image data for image recording (i.e., exposing conditions) are sent to the exposing device.

In the exposing device, if it is of a type that relies upon exposure by scanning with optical beams, the latter are modulated in accordance with the supplied image data and deflected in a main scanning direction as the light-sensitive material is transported in an auxiliary scanning direction perpendicular to the main scanning direction, whereby a latent image is formed as the result of scan exposure of the light-sensitive material with the optical beams and a back print is also recorded. In the developing device (processor), the exposed light-sensitive material is subjected to development and other specified processing operations so as to output a print which reproduces the image that has been recorded on the film.

In the exposing device, whether it is in the digital photoprinter or an ordinary photoprinter that relies upon "direct" exposure, a virgin light-sensitive material is in the form of a magazine, i.e., a roll contained in a lightproof case. The light-sensitive material is withdrawn out of the magazine in the exposing device and further transported for exposure and other necessary steps.

In the ordinary photoprinter, the light-sensitive material being transported is not cut but remains a web as it is subjected to exposure, back print recording, development, rinse, drying and other necessary steps and only after these steps are complete, the light-sensitive material is cut to individual prints of a specified length.

This process requires that frame information (frame punches) for delineating individual frames (or prints) be formed before or after the exposure of the light-sensitive material. However, the portion of the light-sensitive material where the frame information is formed is simply a waste of space. In addition, frame information have to be formed by special means having a punch, a sensor or the like.

In the exposing device of a digital exposure type, the light-sensitive material must be transported for scanning in high precision and without stops in order to record images of high quality that are free from unevenness and other defects. To meet this need, a slack (loop) of the light-sensitive material is allowed to form both upstream and downstream of the exposing position but then this increases the complexity of the transport zone for the light-sensitive material and the control of its transport.

Under the circumstances, it may be proposed that in the digital photoprinter, exposure be performed on a light-sensitive material after it is cut to sheets corresponding to individual prints to be finally produced and analog photoprinters operating on this idea have already been commercialized.

With photoprinters, development and subsequent steps generally take more time than exposure. If exposure (image recording) is performed continuously in parallel with development and subsequent steps, the former outpaces the latter and the exposed but yet to be developed light-sensitive material gradually builds up. In other words, the development and subsequent steps are rate limiting and the exposing operation has to be stopped.

In photoprinters of a type that cuts the light-sensitive material into sheets in the last step, a reservoir is provided between the exposing section and the developing machine to store the exposed light-sensitive material temporarily. As a result, the development and subsequent steps are not rate limiting and continuous exposure can be accomplished to realize efficient processing.

In photoprinters of a type that performs exposure after the light-sensitive material is cut into sheets, the operating efficiency can be improved by accommodating the sheets of exposed light-sensitive material in a stocker or the like. However, this approach involves difficulty in the management of the order of exposing the cut sheets (by making reference to the frame number and by sorting), as well as in achieving smooth ejection of the sheets from the stocker or the like.

To overcome this difficulty, the cut sheets of the exposed light-sensitive material, before they are fed into the developing machine, are distributed in a lateral direction perpendicular to the direction of their transport, so as to form a plurality of rows that overlap in the direction of transport. In this way, the throughput of the developing machine can be improved over the case where individual sheets of the light-sensitive material are processed in a single row (almost doubled in two rows and tripled in three rows) and the difference in speed between exposure and development processing is practically cancelled.

However, if a device that performs such distribution of the sheets of light-sensitive material is provided in a photoprinter, the pathlength over which the light-sensitive material is transported is increased and the size of the photoprinter and its cost will increase unavoidably.

Distribution of the cut sheets of light-sensitive material should not affect exposure and any other steps in the processing of the light-sensitive material. Take, for example, a photoprinter that has a capability for processing 1800 prints of the most common L size per hour. Since one print is processed (exposed) every two seconds, the distributing device must accordingly complete the necessary operation consisting of the acceptance of incoming sheets of the exposed light-sensitive material, their distribution and making preparations for the acceptance of the next coming sheet.

In order to meet this requirement, the conventional distributing device is adapted to consist of three blocks, a high-speed transport block, a distributing block and a speed regulating block; in the high-speed transport block, the sheets of light-sensitive material emerging from the exposing section are transported into the distributing block at high speed so that the distance to the next coming sheet is long enough to secure the time necessary for performing the intended distribution and in the distributing block, the sheets are distributed in the lateral direction by a suitable method, such as moving the sheets sidewise together with the transport means, and thereafter transported into the speed regulating block, where the transport speed of the sheets is adjusted to one that is compatible with development before they are fed into the developing machine.

As a result, compared to the case where no such distributing device is employed, the pathlength of the light-sensitive material is increased considerably and the size and cost of the photoprinter will increase accordingly. Particularly in the case where individual sheets of light-sensitive material must be distributed keeping pace with rapid print production such as processing one print every two seconds, the increase in the pathlength of the light-sensitive material is prohibitive.

SUMMARY OF THE INVENTION

The present invention has been accomplished under these circumstances and has as an object providing a method of distributing sheets of light-sensitive material which is to be used with an image recording apparatus (exposing apparatus) that performs exposure, preferably digital scan exposure, on cut sheets of light-sensitive material and which feeds the exposed sheets of light-sensitive material into a developing machine, the method being characterized by requiring only a short pathlength and having a capability for distributing the sheets of light-sensitive material, practically keeping pace with rapid print production (imagewise exposure) such as processing one print every two seconds.

Another object of the invention is to provide a light-sensitive material distributing device for implementing the above-described method, which apparatus is small in size and characterized by a simple and low-cost layout.

In order to attain the first object, the invention provides a method of distributing sheets of light-sensitive material having a specified length for use in an image recording apparatus that performs exposure to form a latent image on the sheets of light-sensitive material and which feeds the exposed sheets of light-sensitive material into a developing machine, wherein the sheets of light-sensitive material are distributed in a lateral direction perpendicular to their transport through said developing machine to form a plurality of rows, said method using two distributing units that lift the sheets of light-sensitive material and transport said sheets in said lateral direction, and said two distributing units being alternately put into action to distribute the sheets of light-sensitive material into a plurality of rows.

In a preferred embodiment, the exposure of the sheets of light-sensitive material is referenced to their center and wherein said two distributing units transport the sheets of light-sensitive material in opposite directions and alternately to distribute the sheets into two rows, or three rows one of which is provided by simply passing the sheets straight without activating either of the two distributing units.

In another preferred embodiment, the exposure of the sheets of light-sensitive material is scan exposure that is performed as said sheets of light-sensitive material are transported by scan transport means and wherein the sheets of light-sensitive material are distributed on a belt conveyor located immediately downstream of said scan transport means.

In order to attain its second object, the invention provides a distributing device comprising two lift units that each hold and lift a sheet of light-sensitive material, a substrate having guide means that engage the respective lift units to guide the lift units in oblique directions in which the lift units progressively depart from each other, two paddle plates that are supported on said substrate in such a way that the paddle plates are pivotal about a common center shaft positioned inward of said guide means and each of which engages either one of said lift units, an urging means that urges said two paddle plates in directions in which the paddle plates approach each other, and a drive means of pivoting one of said paddle plates to depart from the other paddle plate.

Preferably, said guide means guide the respective lift units in symmetric oblique directions and a center shaft for said two paddle plates is positioned on a center line with respect to which said oblique directions are symmetrical.

In another preferred embodiment, each of said lift units holds and lifts the sheet of light-sensitive material from the belt conveyor, moves the sheet in one of said oblique directions and replaces the sheet on the belt conveyor.

The method and device of the invention for distributing sheets of light-sensitive material are applicable to an image recording apparatus (exposing apparatus) that performs exposure on cut sheets of light-sensitive material and which supplies the exposed light-sensitive material into a developing machine. Employing a short pathlength, the method is capable of distributing individual sheets of light-sensitive material into two or three rows, practically keeping pace with rapid print production (imagewise exposure) such as processing one print every two seconds. The device of the invention for implementing this method is small in size and features a simple and low-cost layout.

DETAILED DESCRIPTION OF THE INVENTION

The method and device of the invention for distributing sheets of light-sensitive material will now be described in detail with reference to the preferred embodiments shown in the accompanying drawings.

Figure 1:
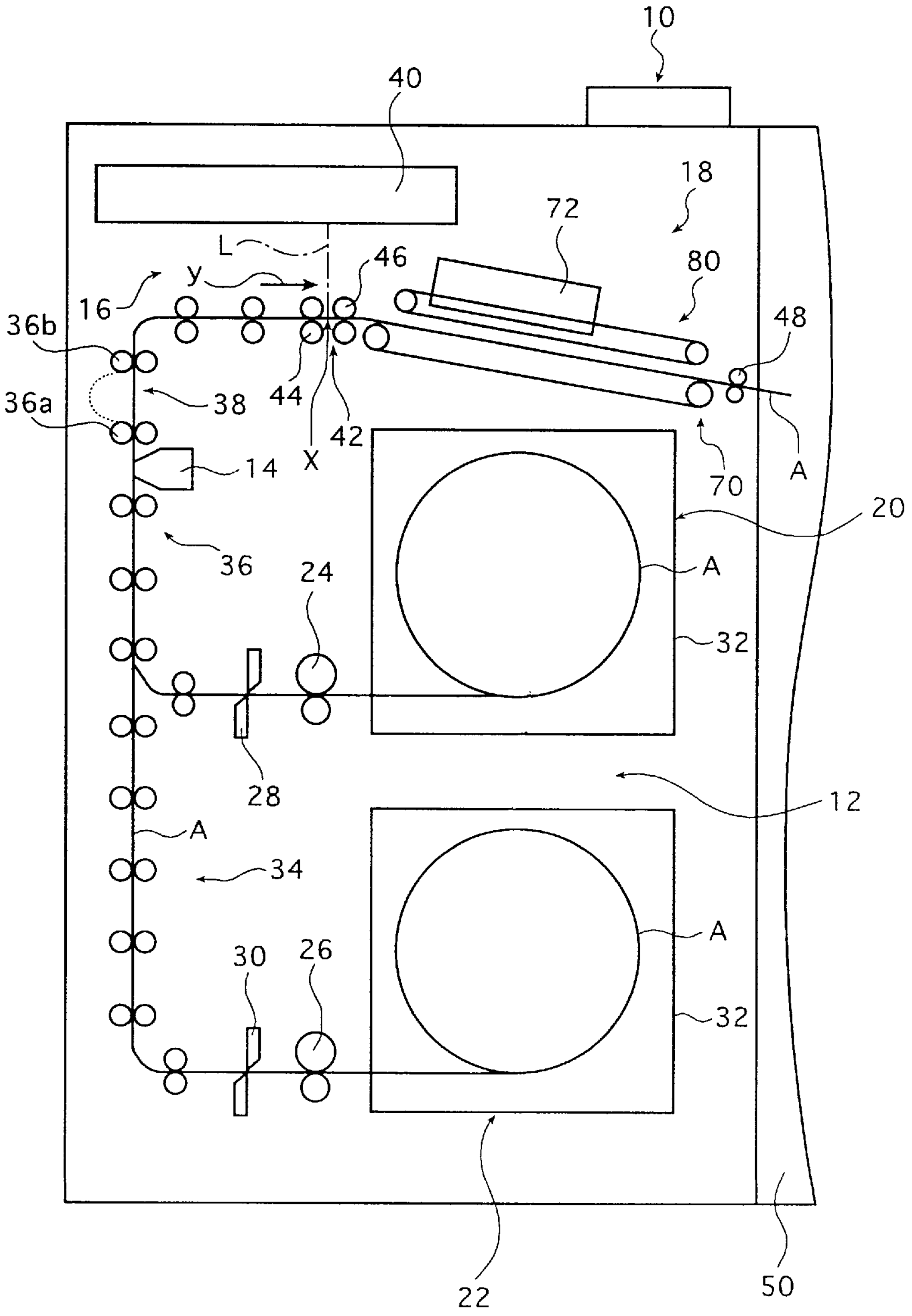
FIG. 1 shows in conceptual form an exemplary image recording apparatus utilizing the light-sensitive material distributing device of the invention which implements the method of the invention for distributing sheets of light-sensitive material.

FIG. 1 is a diagrammatic view of an image recording apparatus utilizing the light-sensitive material distributing device of the invention which implements the method of the invention for distributing sheets of light-sensitive material.

The image recording apparatus indicated by 10 in FIG. 1 and which is hereinafter simply referred to as the "recording apparatus" is intended for use as an exposing apparatus in a digital photoprinter of the type described in connection with the prior art. The recording apparatus 10 is such that a web of light-sensitive material is cut to individual sheets of a specified length associated with the prints to be finally produced and, after back printing (recording of a back print) and digital scan exposure, the exposed sheets of light-sensitive material A are supplied into the distributing device of the invention which implements the distributing method of the invention to optionally distribute those sheets into a plurality of rows before they are further fed into a processor (developing machine) 50.

Having these capabilities, the recording apparatus 10 comprises a light-sensitive material supply section 12, a printer 14 for recording a back print, an image recording section 16 for exposing the light-sensitive material A in a recording (exposing) position X, and a light-sensitive material distributing device 18 of the invention which implements the light-sensitive material distributing method of the invention to optionally distribute the exposed sheets of light-sensitive material A into a plurality of rows.

It should be noted that, in addition to the illustrated components, means of transporting the light-sensitive material A such as transport rollers, transport guides, sensors and various other members are also incorporated, as required, in the recording apparatus 10.

Further referring to the recording apparatus 10, the light-sensitive material supply section 12 (hereinafter referred to as a "supply section 12") is composed of loaders 20 and 22, withdrawing roller pairs 24 and 26, and cutters 28 and 30.

The loaders 20 and 22 are sites into which are loaded magazines 32 containing a roll of light-sensitive material A within a lightproof case, with the recording surface side facing outward. The magazines 32 to be loaded into both the loaders 20 and 22 are usually adapted to contain different types of light-sensitive material A which is characterized by their size (width), surface gloss (silk-finish, matte and so forth), specifications (e.g. thickness and base type), and so forth. The number of the magazines 32 that can be loaded may be adapted to be capable of loading only one magazine or three and more magazines depending on the size and structure of the recording apparatus 10.

The withdrawing roller pair 24 or 26 is operated to withdraw the light-sensitive material A from the magazine 32 loaded into the corresponding loader 20 or 22 and the withdrawn light-sensitive material is transported. The transport stops at the point of time when the light-sensitive material A has been transported downstream from the corresponding cutter 28 or 30 by a length corresponding to each of the prints to be produced. Subsequently, the cutter 28 or 30 turns on to cut the light-sensitive material A to individual sheets of a specified length. It should be noted that one cutter can be used in a plurality of loaders.

The light-sensitive material A taken out of the magazine 32 in the loader 22 and cut into individual sheets of a specified length by means of the cutter 30 is transported upward by means of the first transport section 34 and the second transport section 36 each consisting of a number of transport roller pairs. On the other hand, the light-sensitive material A taken out of the magazine 32 in the loader 20 and cut into individual sheets by means of the cutter 28 is transported upward by means of the second transport section 36. Subsequently, these sheets are both transported in the right direction to the image recording section 16 (scanning transport means 42) with the recording surface side facing upward.

The printer 14 is located in the middle of the second transport section 36.

The printer 14 is used to record on a non-record reverse surface of the light-sensitive material A (where no emulsion is coated), a back print consisting of various pieces of information, such as the date when the picture was taken, the date of printing (exposure), frame number, film identification (ID) number (code), ID number of the camera used to take the picture and ID number of the photoprinter. The light-sensitive material A is subjected to back print recording by means of the printer 14 as it is transported by means of the second transport section 36.

Examples of the printer 14 for back print recording include back printers for use in known photoprinters such as an ink-jet printer, a dot impact printer and a thermal transfer printer. To be compatible with the recently developed Advanced Photo System, the printer 14 is preferably adapted to be capable of marking at least two lines at a time.

A loop forming area 38 is provided between the transport roller pairs 36*a* and 36*b* which are downstream of the printer 14 in the second transport section 36.

Thus, the transport speed of the light-sensitive material A in the second transport section 36 is set as follows: the speed in the transport roller pair 36*b* and subsequent components which are downstream of the loop forming area 38 is the same as the scanning transport speed in the image recording section 16 (scanning transport means 42), whereas the speed in the transport roller pair 36*a* and prior components which are upstream of the loop forming area 38 is higher than the above scanning transport speed. The light-sensitive material A transported through the second transport section 36 forms a loop in the loop forming area 38 in accordance with its size based on the difference in the upstream/downstream transport speed, as shown by the dotted line in FIG. 1.

In the illustrated recording apparatus 10, this configuration enables the isolation of the printer 14 from the image recording section 16 with a short pathlength, whereby a highly precise scanning and transport of the light-sensitive material A in the course of exposure is realized.

The image recording section 16 comprises an exposing unit 40 and scanning transport means 42. The recording light L modulated in accordance with the image data (recorded image) and deflected in the main scanning direction (normal to the plane of FIGS. 1 and 2; direction indicated by arrow x in FIG. 3) which is perpendicular to the direction in which the light-sensitive material A is transported for scanning emits from the exposing unit 40 and is incident on the recording position X, as the light-sensitive material A is held in a specified recording position X by means of the scanning transport means 42 and transported for scanning in the direction indicated by arrow y, whereupon the light-sensitive material A is exposed by two-dimensional scanning to form a latent image on the material Z.

It should be noted that, in the illustrated image recording section 16, a side registering (edge position regulation) of the light-sensitive material A is performed so that the center of the light-sensitive material A in its main scanning direction can be set to a specified position, and the light-sensitive material A is then exposed on a center referenced basis.

The exposing unit 40 is a known optical beam scanner using the light beams including laser beam as the recording light L. The exposing unit 40 comprises light sources which issue optical beams for exposing the light-sensitive material A with red (R), green (G) and blue (B) lights, a modulating means such as AOM (acoustic optical modulator) which modulates the light beams issued from the light sources in accordance with digital image data, a light deflector such as a polygonal mirror which deflects the modulated light beams in a main scanning direction, an fθ (scanning) lens with which the light beams deflected in the main scanning direction are focused to form a beam spot of a specified diameter at a specified point in the recording position X, and a mirror for optical path adjustment.

The exposing unit 40 may be replaced by various kinds of digital exposing means using various arrays of light-emitting devices and spatial modulating devices which extend in a direction perpendicular to the direction in which the light-sensitive material A is transported for scanning. Specific examples of such arrays include a PDP (plasma display) array, an ELD (electroluminescent display) array, an LED (light-emitting diode) array, an LCD (liquid-crystal display) array, a DMD (digital micromirror device) array, or a laser array.

The scanning transport means 42 which is the other component of the image recording section 16 comprises two transport roller pairs 44 and 46 that are provided on opposite sides of the recording position X (scanning line), and an exposure guide 52 (see FIG. 2) to hold more precisely the light-sensitive material A in the recording position X. The light-sensitive material A is transported for scanning in the auxiliary scanning direction perpendicular to the main scanning direction, as it is held in the recording position X. The light beams as the recording light L are deflected in the main scanning direction, so the light-sensitive material A is exposed by two-dimensional scanning with the recording light L modulated in accordance with the image data to thereby form a latent image on the material A.

Another example of the scanning transport means is one using an exposing drum that transports the light-sensitive material A as it is held in the recording position X and two nip rollers which are provided on opposite sides of the recording position X in such a way that they are held in contact with the exposing drum.

The light-sensitive material distributing device 18 of the invention is located downstream of the image recording section 16.

The distributing device 18 implements the light-sensitive material distributing method of the invention. It receives the light-sensitive material A ejected from the scanning transport means 42 in the image recording section 16 and transports in the same direction as the scan transport direction (indicated by arrow y); at the same time, two distributing units, i.e., a first sucker unit 92 and a second sucker unit 94, are activated alternately to distribute individual sheets of the light-sensitive material A in a direction perpendicular to their transport (through the processor 50), namely, in the main scanning direction (which is hereinafter referred to as the "lateral direction") to form a plurality of rows, which are then carried to the transport roller pair 48, through which the light-sensitive material A is supplied to the processor 50 (entry into the processor is thus effected).

As described above, development processing is generally more time-consuming than exposure. By the distributing device 18, individual sheets of the light-sensitive material A to be processed in the processor 50 are distributed in the lateral direction into a plurality of rows that overlap in the direction of transport and, as a result, the throughput of the processor 50 can be almost doubled in two rows and tripled in three rows and the time difference between development processing and exposure is practically cancelled.

Figure 2:
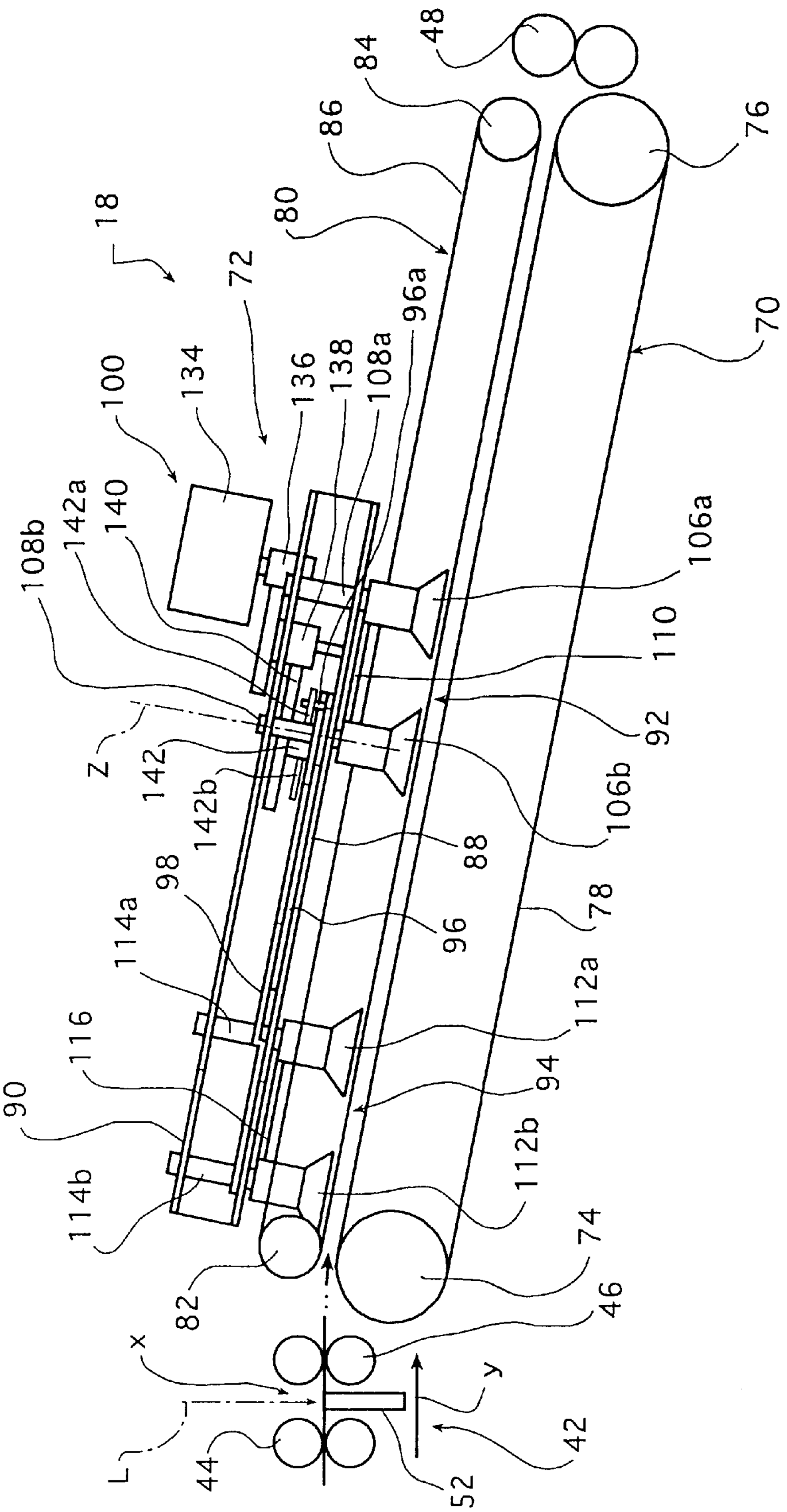
FIG. 2 is a diagrammatic side view of the light-sensitive material distributing device of the invention shown in FIG. 1.
Figure 3:
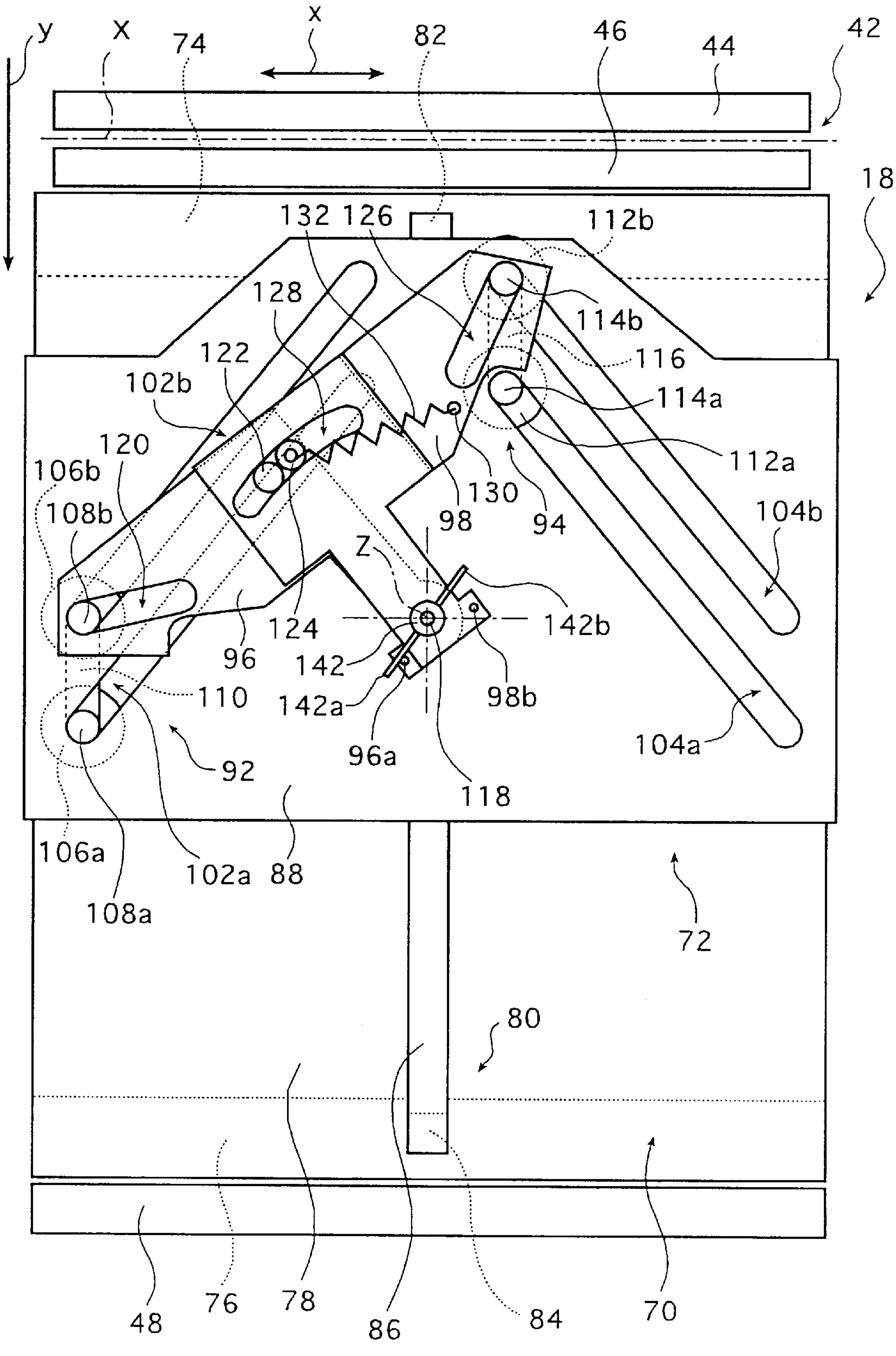
FIG. 3 is a diagrammatic plan view of the light-sensitive material distributing device of the invention shown in FIG. 2.

FIG. 2 is a side view of the distributing device 18 and FIG. 3 is a plan view, with part taken away, of the same device. The distributing device 18 comprises basically belt conveyor 70 on which the light-sensitive material A is placed and transported and a lift transport mechanism 72 having the first sucker unit 92 and the second sucker unit 94. The light-sensitive material A exposed in the image recording section 16 is ejected onto the belt conveyor 70, which carries the exposed light-sensitive material A to a specified position, whereupon it is lifted by the first sucker unit 92 or the second sucker unit 94 in the lift transport mechanism 72 and transported obliquely downstream to be set aside to either right or left; the light-sensitive material A is replaced on the belt conveyor 70 and transported as such to be fed through the transport roller pair 48.

The distributing device 18 having the above-described construction is provided immediately downstream of the image recording section 16 (particularly the scanning transport means 42 in it) which performs exposure on a center referenced basis and which coincides with the distributing device 18 in terms of the center in the lateral (main scanning) direction (which is hereinafter referred to simply as the "center").

The belt conveyor 70 is of a known type that comprises two rollers 74 and 76, an endless belt 78 stretched between the two rollers, and a drive source which is not shown in FIG. 2. As already mentioned, the belt conveyor 70 receives the exposed sheets of light-sensitive material A, transports them, has them picked up and distributed into a plurality of rows by means of the lift transport mechanism 72, receives the rows of sheets, and further transports them to be fed through the transport roller pair 48 for entry into the processor.

In the recording apparatus 10, the distance from the scanning transport means 42 (particularly the transport roller pair 46) to the transport roller pair 48 depends on and must be greater than the length of a print that has the largest size in the direction of transport of all the prints to be handled by the recording apparatus 10; therefore, the position and transport length of the belt conveyor 70 are set at such values that depending on the distance between the scanning transport means 42 and the transport roller pair 48, the light-sensitive material A can be transported from the former to the latter in a consistent manner. If the distance between the scanning transport means 42 and the transport roller pair 48 is too long, the overall pathlength increases to eventually increase the equipment cost and size; this is another consideration that is preferably included in determining the distance between the scanning transport means 42 and the transport roller pair 48.

The lateral size (width) of the belt conveyor 70 depends on various factors such as the maximum print size across width and the number of rows into which sheets of the light-sensitive material are to be distributed and a suitable value may be selected that ensures consistent and positive transport of the light-sensitive material A.

In the illustrated distributing device 18, the belt conveyor 70 is inclined to slope downward in the direction of transport of the light-sensitive material A. This is a preferred embodiment in that the occurrence of troubles such as jamming of the light-sensitive material A due to the curl it usually possess and its buckling are effectively prevented to ensure that the distributing device 18 can accept the light-sensitive material A from the scanning transport means 42 and supply it into the processor 50 in a more smooth and consistent manner.

The angle by which the belt conveyor 70 inclines downward is not limited to any particular value, except that if it is too large, the light-sensitive material A will not stay on the belt conveyor 70 but just slide down; therefore, the inclination of the belt conveyor 70 is preferably between about 5 and 30 degrees.

The travelling speed of the belt conveyor 70 may be determined as appropriate depending upon such factors as the throughput of the recording apparatus 10 and the scanning transport speed. Preferably, the travelling speed of the belt conveyor 70 is slightly higher than the scanning transport speed in order to ensure that any effect that may be caused on the transport of the light-sensitive material A for scanning when it is placed on (brought into contact with) the belt conveyor 70 can be eliminated more positively.

Specifically, considering the variations in the scanning transport speed, the stability of transport by the belt conveyor 70 and other factors, the travelling speed of the belt conveyor 70 is preferably 2–10% faster than the scanning transport speed.

In the illustrated distributing device 18, the belt conveyor 70 has above it a less wide auxiliary belt conveyor 80 that runs along its center line. The auxiliary belt conveyor 80 comprises rollers 82 and 84 and an endless belt 86 stretched between the two rollers. The auxiliary belt conveyor 80 is driven at the same speed as the underlying belt conveyor 70.

The auxiliary belt conveyor 80 does not cooperate with the underlying belt conveyor 70 to transport the light-sensitive material A as it is held between the two conveyors; rather, the auxiliary belt conveyor 80 is spaced from the belt conveyor 70 by a certain distance. Thus, the primary function of the auxiliary belt conveyor 80 is to depress any curl of the light-sensitive material A, thereby ensuring that the light-sensitive material A is positively transported by the belt conveyor 70 and sucked in position by the lift transport mechanism 72 while, at the same time, the consistency in the entry of the light-sensitive material A into the processor is improved.

The clearance between the belt conveyor 70 and the auxiliary belt conveyor 80 is not limited to any particular value. However, if the clearance is unduly small, the transport for scanning of the light-sensitive material A during exposure is adversely affected and, in addition, the light-sensitive material A will travel at an angle with the center line (cannot run straight). Conversely, if the clearance is excessive, there is no sense in providing the auxiliary belt conveyor 80 and the consistency in the entry of the light-sensitive material A into the processor will in no way be improved. Considering these facts, the clearance between the belt conveyor 70 and the auxiliary belt conveyor 80 is preferably set at between about 4 and 20 mm.

The lift transport mechanism 72 comprises the following basic components: a lower substrate 88, an upper substrate 90 (not shown in FIGS. 3–6), the first sucker unit 92 and the second sucker unit 94 which are positioned symmetrically with respect to the center line, i.e., the auxiliary belt conveyor 80, in such a way that the first sucker unit 92 is on the right side of the direction of transport indicated by arrow y (the term "right side" as used hereinafter has this meaning) and the second sucker unit 94 on the left side, a first paddle 96 in engagement with the first sucker unit 92, a second paddle 98 in engagement with the second sucker unit 94, and drive means 100 for pivoting the two paddles (the drive means 100 is not shown in FIGS. 3–6).

In the distributing device 18, either of the two sucker units in the lift transport mechanism 72 is turned on to suck the light-sensitive material A in position and by allowing the first sucker unit 92 on the right side to move obliquely to the right and outwardly in a downstream direction and the second sucker unit 94 on the left side to move obliquely to the left and outwardly in a downstream direction, sheets of the light-sensitive material A are transported in the lateral direction to be distributed into two or three rows.

The lower substrate 88 and the upper substrate 90 serve as boards along which the first sucker unit 92 and the second sucker unit 94 will move; having this function, the two substrates are basically the same in planar shape and spaced apart and held to be fixed parallel to each other by known means using spacers, stays and so forth.

Each of the lower substrate 88 and the upper substrate 90 is provided with a pair of long guide slots 102*a* and 102*b* that extend in the direction of transport of the light-sensitive material A by means of the lift transport mechanism 72 and which guide the first sucker unit 92 on the right side, as well as another pair of long guide slots 104*a* and 104*b* that also extend in the direction of transport of the light-sensitive material A by the lift transport mechanism 72 and which guide the second sucker unit 94 on the left side.

As will be described later, each sucker unit has two suckers arranged in the direction of transport of the light-sensitive material A by the belt conveyor 70 and the two guide slots in each sucker unit correspond to the respective suckers. Hence, the guide slots 102*a* and 102*b*, as well as guide slots 104*a* and 104*b* are formed parallel to each other such that they are spaced apart in the direction of transport of the light-sensitive material A by the belt conveyor 70 but being in registry in their lateral position. In the illustrated case, guide slots 102 and 104 are formed symmetric with respect to the center line.

Aside from the components mentioned above, the lower substrate 88 and the upper substrate 90 have holes, members and the like that serve as supports of various functional parts of the drive means 100.

The first sucker unit 92 for distributing sheets of the light-sensitive material A in the lateral direction by transporting them obliquely to the right in a downstream direction comprises suckers 106*a* and 106*b*, retainer shafts 108*a* and 108*b*, and a linking member 110. The second sucker unit 94 for distributing sheets of the light-sensitive material A in the lateral direction by transporting them obliquely to the left in a downstream direction comprises suckers 112*a* and 112*b*, retainer shafts 114*a* and 114*b*, and a linking member 116.

The sucker units 92 and 94 that suck the light-sensitive material A in position and transport them to right or left are provided on opposite sides of the auxiliary belt conveyor 80 and moved along guide slots 102 and 104, respectively. Thus, as already mentioned, the lift transport mechanism 72 uses the two sucker units to suck sheets of the light-sensitive material A in position and transport them to both right and left so that they are distributed in a plurality of rows. Therefore, the width of the aforementioned auxiliary belt conveyor 80 and the positions of the guide slots 102 and 104 in their lateral direction on an upstream end are set in such a way that the light-sensitive material A in the form of cut sheets of a minimum size to be distributed can be sucked by means of the suckers in each sucker unit. In addition, exposure of the light-sensitive material A is performed on a center referenced basis, so the first sucker unit 92 will suck the right-hand side of the light-sensitive material A in position whereas the second sucker unit 94 will suck the left-hand side.

Except for the position in which they are provided, the two sucker units have basically the same construction, so the first sucker unit 92 will be described below as a representative case.

The retainer shaft 108*a* (or 114*a*) is retained in the guide slot 102*a* (or 104*a*) in the lower substrate 88 and the upper substrate 90 by any known means such that it is free to move in the direction in which the guide slot 102*a* (or 104*a*) extends. Similarly, the retainer shaft 108*b* (or 114*b*) is retained in the guide slot 102*b* (or 104*b*) in the substrates by any known means such that it is free to move in the direction in which the guide slot 102*b* (or 104*b*) extends. Thus, each sucker unit is guided by the corresponding guide slots to move in the direction of transport of the light-sensitive material A.

The sucker 106*a* (or 112*a*) is retained at the lower end of the retainer shaft 108*a* (or 114*a*) such that it can be raised or lowered and the sucker 106*h* (or 112*b*) is retained at the lower end of the retainer shaft 108*b* (or 114*b*) such that it can be raised or lowered. A suction hose (not shown) connected to a vacuum pump or the like is connected to the upper end of each retainer shaft 108 for allowing each sucker 106 to suck the light-sensitive material A in position.

Suckers 106*a* and 106*b* (or 112*a* and 112*b*) are coupled by the linking member 110 (or 116) so that they are fixed together as they are arranged in the direction of transport of the light-sensitive material A by the belt conveyor 70; this is how the first sucker unit 92 is composed.

The first sucker unit 92 is equipped with vertical moving means, or means of raising or lowering the suckers 106*a* and 106*b* so that the light-sensitive material A can be sucked up. The means of raising or lowering the suckers 106 is not limited to any particular type and an exemplary means may be as follows: both suckers 106 are urged upward by springs or some other suitable means so that they are retained on the retainer shafts 108; the linking member 110 shaped to be convex upward in the center and an air cylinder or like means that depresses the underside of the lower substrate 88 is provided on top of the linking member 110 and the suckers 106 are lifted if the cylinder or like means depresses the underside of the lower substrate 88; otherwise, the suckers are lowered.

This is not the sole means of raising or lowering the suckers in the distributing device of the invention and other methods that can be employed are as follows: a method in which each sucker is fixed to a support shaft, which is raised or lowered; a method in which the lower substrate 88 either alone or in combination with the upper substrate 90 is raised or lowered; a method in which the belt conveyor 70 (and auxiliary belt conveyor 80) are raised or lowered; and a method in which a fulcrum is provided in a position distant from each sucker (sucker unit) so that suckers (or sucker units) can be raised or lowered by oscillation or a pivoting action. Aside from cylinders, a cam or link mechanism may be employed as a drive source of raising or lowering suckers.

The first paddle 96 and the second paddle 98 are provided on top of the lower substrate 88. The two paddles are plates that are supported on a support shaft 118 having a center Z coinciding with the center in the lateral direction (on the center line of transport of the light-sensitive material A) and which are pivotal independently of each other; the paddles are also urged by a spring 132 to be described later in such directions that they come closer to each other.

As shown in FIG. 3, a slot 120 is formed near the end of the first paddle 96 which is remote from the second paddle 98. The retainer shaft 108*b* is passed through the slot 120 so that the shaft is in engagement with the slot and can move along to bring the first sucker unit 92 on the right side into engagement with the first paddle 96. A rod of stopper 122 is fixed on the top surface of the first paddle 96 near the end close to the second paddle 98 and an engaging member 124 is fixed outward of the stopper 122. A rod of pin 96*a* is fixed perpendicular to the first paddle 96 in a position which is near the support shaft 118 but where the first paddle 96 does not overlap the second paddle 98.

A slot 126 is formed near the end of the second paddle 98 which is remote from the first paddle 96. The retainer shaft 114*b* is passed through the slot 126 so that the shaft is in engagement with the slot and can move along to bring the second sucker unit 94 on the left side into engagement with the second paddle 98. A slot 128 is formed near the end of the second paddle 98 which is close to the first paddle 96, and the stopper 122 and the engaging member 124 on the first paddle 96 are passed through the slot 128 such that they are free to move along it. A rod of pin 98*b* is fixed perpendicular to the second paddle 98 in a position which is near the support shaft 118 and which is remote from the pin 96*a* on the first paddle 96 with respect to the support shaft 118.

In addition, an engaging member 130 is fixed near end of the second paddle 98 which is remote from the first paddle 96 and a spring 132 is loaded between this engaging member 130 and the other engaging member 124 on the first paddle

96 so that the two paddles are urged in directions in which they come closer to each other.

Because of the arrangement described above, if the drive means 100 pivots the first paddle 96 counterclockwise, the second paddle 98 is pulled via the spring 132 to pivot in the same direction; on the other hand, if the drive means 100 pivots the second paddle 98 clockwise, the first paddle 96 is pulled via the spring 132 to pivot in the same direction.

The drive means 100 comprises a motor 134 which is a drive source capable of rotation in opposite directions, a gear 136 fixed on the rotating shaft of the motor 134, a speed reducing gear 138 meshing with the gear 136, a gear 140 that meshes with the speed reducing gear 138 and which is axially supported on the support shaft 118, and a cylindrical rotating member 142 that is fixed to the gear 140 and which is axially supported on the support shaft 118 to be rotatable. Through-holes and support shafts that assist in arranging these components of the drive means 100 are provided in or on the upper substrate 90 and the lower substrate 88.

In the illustrated case, the transmission of the rotation of the motor 134 from the gear 136 to the speed reducing gear 138 is accomplished by meshing between the two gears but the same result can be attained by a timing belt stretched between the two gears.

The sidewall of the pivoting member 142 is provided with pivot pins 142*a* and 142*b* that extend from a height engageable with the pin 96*a* on the first paddle 96 and the pin 98*b* on the second paddle 98 in such a way that they project along an extension of the diameter of the pivoting member 142.

Because of the arrangement described above, if the motor 134 is driven to rotate the pivoting member 142 counterclockwise, the pivot pin 142*a* pushes the pin 96*a* on the first paddle 96 which, in turn, pivots the first paddle 96 counterclockwise so that the first sucker unit 92 in engagement with the first paddle 96 moves along the guide slots 102. Conversely, if the motor 134 is driven in reverse direction to rotate the pivoting member 142 clockwise, the pivot pin 142*b* pushes the pin 98*b* on the second paddle 98 which, in turn, pivots the second paddle 98 clockwise so that the second sucker unit 94 in engagement with the second paddle 98 moves along the guide slots 104.

It should be added that by the action of the spring 132, the paddle that is not driven by the pivoting member 142 is also allowed to pivot in the same direction as the other paddle that has been allowed to pivot by the action of the pivoting member 142.

The movements of the first sucker unit 92 and the second sucker unit 94 will now be described with reference to FIGS. 3–6.

FIG. 3 shows one of the actions the two sucker units perform when sheets of the light-sensitive material A are distributed into three rows, as will be described later more specifically. The first sucker unit 92 is in a position where it has transported the light-sensitive material A and the second sucker unit 94 is in a position where it is ready for sucking and holding in place the light-sensitive material A on the belt conveyor 70 (this position of the second sucker unit is hereinafter referred to as “home position”). When the motor 134 runs to rotate the pivoting member 142 clockwise, the pivot pin 142*a*, the pin 96*a* on the first paddle 96 and the spring 132 work in combination to pivot the first paddle 96 clockwise, whereupon the first sucker unit 92 (having the suckers 106*a* and 106*b*) in engagement with the slot 120 in the first paddle 96 are guided by the guide slots 102 to move along upstream to the left until the orientation shown in FIG. 4 is reached.

Figure 4:
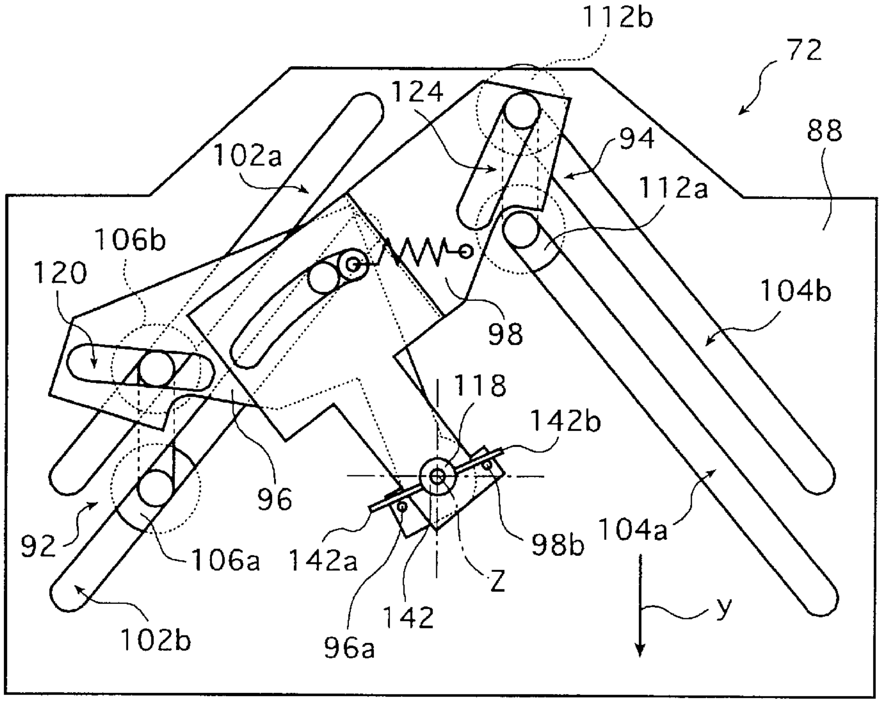
FIG. 4 is a diagrammatic plan view of the lift transport mechanism in the light-sensitive material distributing device of the invention shown in FIG. 2.

When the orientation shown in FIG. 4 is reached, the pivot pin 142*b* engages the pin 98*b* on the second paddle 98. Upon further clockwise rotation of the pivoting member 142, the pivot pin 142*b* pushes the pin 98*b*, causing the second paddle 98 to rotate clockwise. As a result, the second sucker unit 94 (having the suckers 112*a* and 112*b*) in engagement with the slot 126 in the second paddle 98 are guided by the guide slots 104 to move along downstream to the left of FIG. 5).

Figure 5:
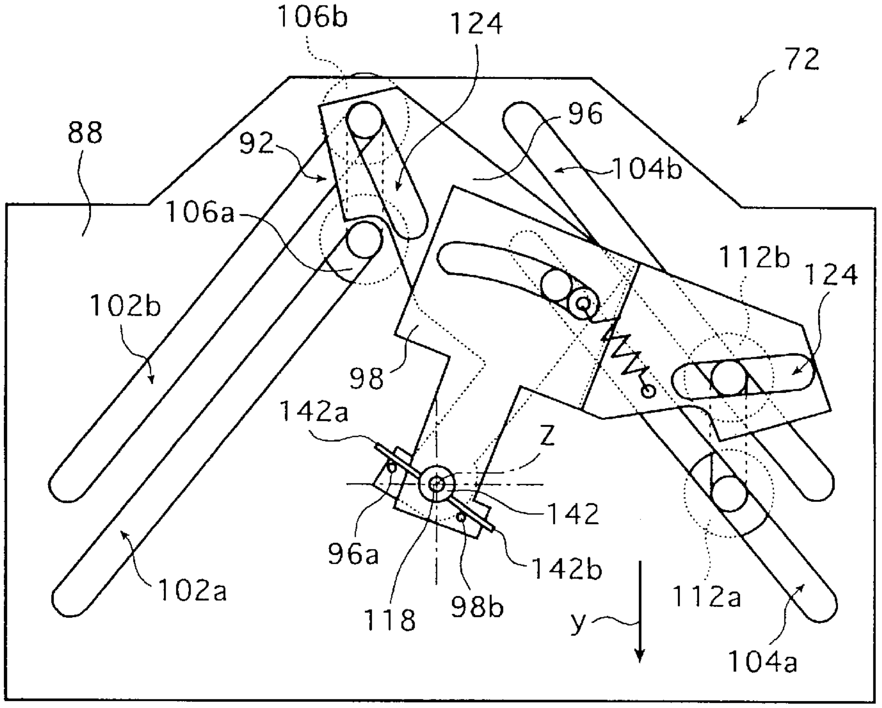
FIG. 5 is a diagrammatic plan view of the lift transport mechanism which is in a different state than it is shown in FIG. 4.

When the pivot pin 142*b* engages the pin 98*b* (as shown in FIG. 4), the first paddle 96 no longer receives the pivoting force transmitted from the pivoting member 142; however, the spring 132 pulls the first paddle 96 toward the second paddle 98 so that it also pivots clockwise and the first sucker unit 92 is guided by the guide slots 102 to move along upstream to the left until the home position shown in FIG. 5 is reached.

Figure 6:
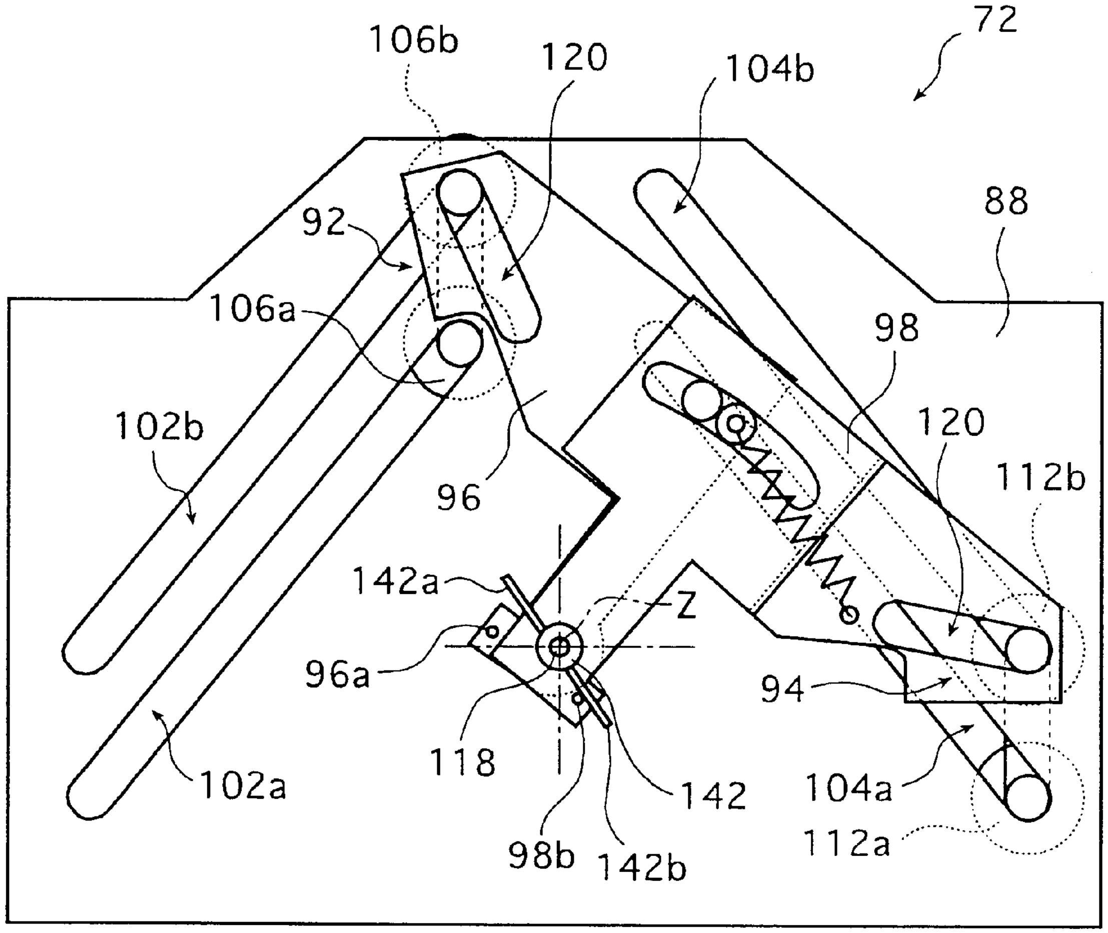
FIG. 6 is a diagrammatic plan view of the light transport mechanism which is in a different state than it is shown in FIG. 5.

When the pivoting member 142 further rotates clockwise to pivot the second paddle 98, the second sucker unit 94 is guided by the guide slots 104 to move along downstream to the farthest end as shown in FIG. 6. At this point of time, the motor 134 stops running and the pivoting member 142 no longer pivots. The motor 134 may be controlled by a known method such as pulse control.

When the motor 134 stops, the first sucker unit 92 in the home position is in engagement with the guide slots 102 and makes no further movement but the spring 132 expands in response to the pivoting of the second paddle 98.

After the orientation shown in FIG. 6 was reached, the motor 134 in the drive means 100 is run in reverse direction, whereupon the pivoting member 142 rotates counterclockwise and through the sequence of the actions shown in FIGS. 6, 5, 4 and 3 in that order, the first and second paddles pivot counterclockwise to move the respective sucker units rightward.

Stated specifically, when the pivoting member 142 rotates counterclockwise, the spring 132 and other actuating members cause the second paddle 98 to pivot counterclockwise, causing the second sucker unit 94 to move upstream to the right and the pivot pin 142*a* to engage the pin 96*a* (see FIG. 5). Upon further rotation of the pivoting member 142, the first paddle 96 pivots, causing the first sucker unit 92 to move downstream to the right, whereas the second paddle 98 is pulled by the spring 132 to come to the home position (see FIG. 4).

Upon further rotation of the pivoting member 142, the first paddle 96 pivots, causing the first sucker unit 92 to move downstream to the farthest end (see FIG. 3), whereupon the motor 134 stops running. The second sucker unit 94 in the home position is in engagement with the guide slots 104 and makes no further movement.

In the illustrated distributing device 18, the first sucker unit 92 and the second sucker unit 94 are moved to the farthest downstream positions shown in FIGS. 3 and 6, irrespective of the number of rows into which sheets of the light-sensitive material A are distributed. However, this is not the sole case of the invention and the following modification may be applied: if sheets of the light-sensitive material A are to be distributed in three rows, the two sucker units are moved to the positions shown in FIGS. 3 and 6, but in the case of distributing the sheets into two rows, the two sucker units are moved to the positions shown in FIGS. 4 and 5, namely, up to the point of time when the sucker unit not sucking the light-sensitive material A returns to the home position. This way, the sheets of the light-sensitive material A can be distributed more rapidly.

The amount of movements of the sucker units may be controlled and adjusted by controlling the drive of the motor.

Thus, the lift transport mechanism 72 is the heart of the light-sensitive material distributing device 18 which implements the light-sensitive material distributing method of the invention. By moving the first and second sucker units in the manner described above, the lift transport mechanism 72 repeats the lateral transport of the light-sensitive material A, optionally in combination with straight passage of the light-sensitive material without making its lateral transport, whereby the sheets of the light-sensitive material A are distributed in two or three rows.

Figure 7:
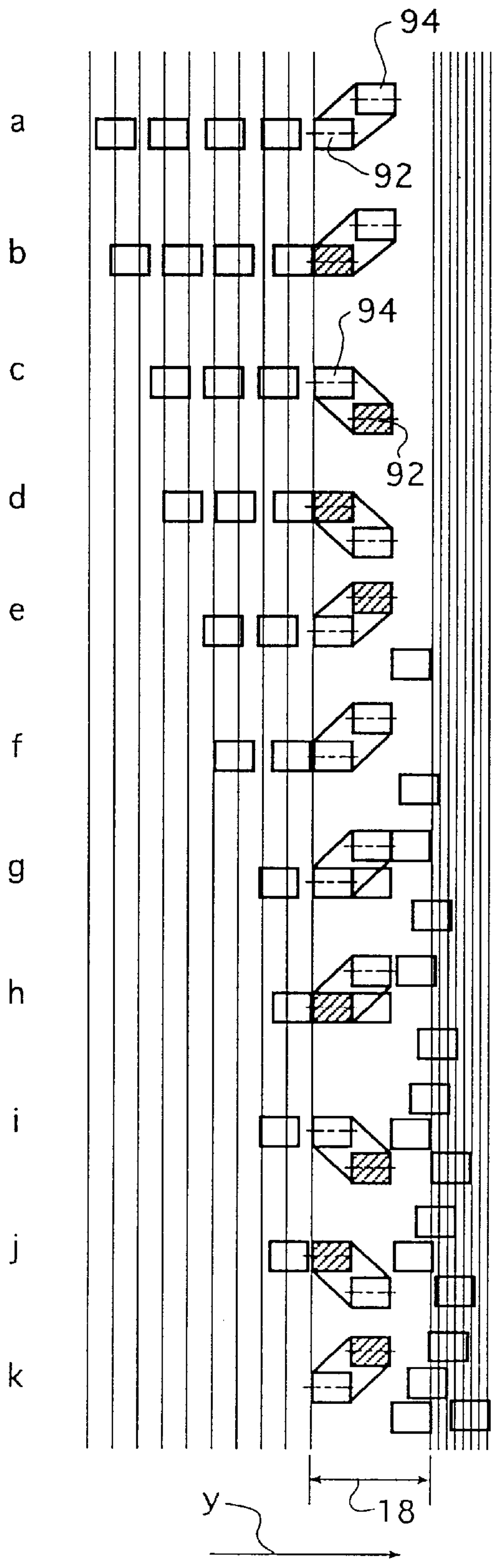
FIG. 7 shows in conceptual form an exemplary way to distribute sheets of light-sensitive material using the light-sensitive material distributing device of the invention shown in FIG. 2.
Figure 8:
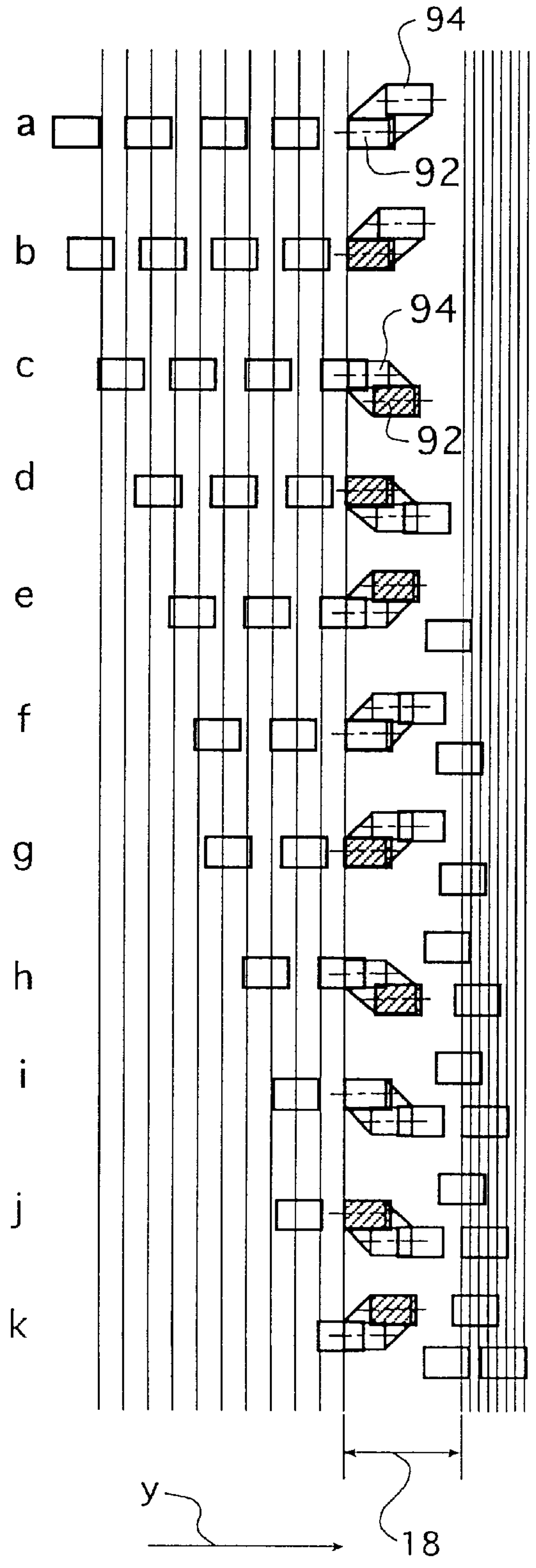
FIG. 8 shows in conceptual form another exemplary way to distribute sheets of light-sensitive material using the light-sensitive material distributing device of the invention shown in FIG. 2.

In order to illustrate the distributing method and device of the invention in greater detail, we will now describe two specific examples of sheet distribution with reference to FIGS. 7 and 8, in which the distributing device 18 occupies the area indicated by the two-headed arrow, with the image recording section 16 (particularly the scanning transport means 42) being in an upstream position and the transport roller pair 48 in a downstream position to perform entry of the light-sensitive material A into the processor.

The vertical lines in FIGS. 7 and 8 provide a schematic representation of the speeds at which the light-sensitive material A is transported in zones upstream and downstream of the distributing device 18. To give a specific example, the vertical lines in the zone upstream of the distributing device 18 are spaced apart by a distance of 80 mm in correspondence with the scanning transport speed of 80 mm/sec, whereas the vertical lines in the zone downstream of the distributing device 18 are spaced apart by a distance of 28.3 mm in correspondence with the transport speed of the transport roller pair 48 (or processor 50), which is 28.3 mm/sec. Hence, the light-sensitive material A is transported from one vertical line to another per second.

In the illustrated case, the travelling speed of the belt conveyor 70 in the distributing device 18 is 84 mm/sec and the transport length is 15 inches in correspondence with a wide version of 10×12 inch size (254×381 mm). In other words, the recording apparatus is capable of handling prints up to a wide version of 10×12 inch size.

In FIGS. 7 and 8, the first sucker unit 92 and the second sucker unit 94 are each represented by a rectangle in which a one-long-and-one-short dashed line is shown to pass through the center; an individual sheet of the light-sensitive material A is represented by an open rectangle; and the sucker unit sucking the light-sensitive material in place is hatched.

In FIGS. 7 and 8, the first sucker unit 92 and the second sucker unit 94 are shown to have the same home position; however, as already mentioned, the two sucker units are actually positioned on opposite sides of the center line and their home positions are symmetric with respect to the center line.

FIG. 7 shows shematically how the distributing device 18 distributes sheets of the light-sensitive material A into three rows. If prints of an L size are to be produced continuously with the illustrated recording apparatus 10, sheets of the light-sensitive material A are exposed at an approximate rate of one sheet in every two seconds (each sheet passes by the exposing point at that rate) and, thereafter, the exposed sheets are distributed into three rows and supplied into the processor 50.

In the case shown in FIG. 7, the process starts with the first sucker unit 92 being in the home position whereas the second sucker unit 94 has moved downstream to the left (as shown in FIG. 6).

In FIG. 7*a*, the first coming sheet of light-sensitive material A is transported to a position corresponding to the home position of the first sucker unit 92 (this step is hereinafter referred to as "transport to the home position"). Then, the belt conveyor 70 in the distributing device 18 stops and, as shown in FIG. 7*b*, the vertical moving means turns on to lower the first sucker unit 92 (having the suckers 106*a* and 106*b*) to suck the first sheet in place. The vertical moving means then raises the first sucker unit 92 to hoist the first sheet.

Even if the belt conveyor 70 stops, the exposure in the image recording section 16, namely, the transport of the light-sensitive material for scanning (80 mm/sec) by the scanning transport means 42, is performed continuously at a speed corresponding to the speed of exposing one sheet in about two seconds and, hence, as shown in FIGS. 7*b* and 7*d*, the distance between the sheet in the home position and the next coming sheet decreases and the advancing end of the next coming sheet reaches the home position (the two sheets overlap) but by that point of time, the first coming sheet has already been hoisted to provide a space under which the next sheet can slip; thus, successive sheets of the light-sensitive material A are transported into the distributing device without causing any adverse effects on the transport of the light-sensitive material for scanning and subsequent distribution of the sheets.

When the first sucker unit 92 rises, the belt conveyor 70 runs and so does the motor 134 to rotate the pivoting member 142 counterclockwise, whereupon the first paddle 96 pivots counterclockwise and, as shown in FIG. 7*c*, the first sucker unit 92 moves downstream to the right to transport the first sheet of light-sensitive material A and, at the same time, the second sucker unit 94 moves to the home position (as shown in FIG. 3).

By that time, the second sheet of light-sensitive material A has been transported to the home position in the illustrated case; the belt conveyor 70 then stops and the vertical moving means lowers both sucker units and, as shown in FIG. 7*d*, the first sucker unit 92 releases the first sheet of light-sensitive material A and replaces it on the belt conveyor 70; at the same time, the second sucker unit 94 sucks the second sheet of light-sensitive material A and thereafter both sucker units rise.

Subsequently, the belt conveyor 70 runs and so does the motor 134 to rotate the pivoting member 142 clockwise and, as shown in FIG. 7*e*, the second sucker unit 94 moves downstream to the left to transport the second sheet of light-sensitive material A while, at the same time, the first sucker unit 92 moves to the home position. In the meantime, the first sheet of light-sensitive material A is transported by the belt conveyor 70 at a speed of 84 mm/sec to reach the transport roller pair 48, from which it is transported at the transport speed in the processor 50 (i.e., 28.3 mm/sec).

Subsequently, the belt conveyor 70 stops and the second sucker unit 94 lowers and, as shown in FIG. 7*f*, it releases the second sheet of light-sensitive material A and replaces it on the belt conveyor 70; thereafter, the second sucker unit 94 rises and the belt conveyor 70 starts to run.

In order to distribute sheets of the light-sensitive material A into three rows by means of the illustrated distributing device 18, the third sheet coming next is not subjected to any distribution action but simply allowed to pass straight on the center line of the belt conveyor 70 after the first sheet was set aside to the right and the second sheet to the left. Hence, in the cases shown in FIGS. 7*e*–7*g*, the first sucker unit 92 makes no action and the third sheet of light-sensitive material A is simply transported by the belt conveyor 70.

When the fourth sheet of light-sensitive material is transported to the home position as shown in FIG. 7*g*, the belt conveyor 70 stops. Since the travelling speed of the belt conveyor 70 is faster than the scanning transport speed, the third sheet of light-sensitive material A has entirely been displaced from the home position.

Subsequently, as shown in FIG. 7*h*, the first sucker unit 92 lowers, sucks the fourth sheet of light-sensitive material A and rises, whereupon the belt conveyor 70 starts running and the pivoting member 142 pivots the first paddle 95 counterclockwise; then, as shown in FIG. 7*i*, the first sucker unit 92 transports the fourth sheet of light-sensitive material A downstream to the right and, at the same time, the second sucker unit 94 moves to the home position. In the meantime, the second and third sheets of the light-sensitive material A reach the transport roller pair 48 and the fifth sheet of light-sensitive material A is transported to the home position.

The subsequent steps are briefly shown in FIGS. 7*j* and 7*k* and in a manner similar to the one described above, the respective sucker units are moved, suck the light-sensitive material A and release it, followed by transport of the light-sensitive material A to the home position and other necessary actions, whereby one sheet is set aside to the right, the next to the left and the third is simply passed straight so that successive sheets of the light-sensitive material A are distributed into three rows.

Although the belt conveyor 70 repeats stops and runs, the difference in travelling speed between the belt conveyor 70 and the transport roller pair 48 (hence, processor 50) will cause successive sheets of the light-sensitive material A to overlap after they entered the processor 50.

FIG. 8 shows shematically how the distributing device 18 distributes sheets of the light-sensitive material A into two rows. In the illustrated recording apparatus 10, a typical case is assumed, in which sheets of the light-sensitive material A up to sizes of 102–152 inches are distributed into two rows and supplied into the processor 50. Obviously, consecutive sheets of the light-sensitive material A are spaced apart by a somewhat greater distance than they are in the case of handling sheets of an L size in FIG. 7.

As in the case shown in FIG. 7, the process of distribution shown in FIG. 8 starts with the first sucker unit 92 being in the home position whereas the second sucker unit 94 having moved downstream to the left. When performing two-row distribution in the case shown in FIG. 8, the sucker units are not moved downstream to the farthest ends of guide slots 102 and 104 but only to the positions shown in FIGS. 4 and 5. Hence, at the first stage of the process, the sucker units are oriented in the positions shown in FIG. 5.

When the first sheet of light-sensitive material A is transported to the home position (FIG. 8*a*), the belt conveyor 70 in the distributing device 18 stops and, as shown in FIG. 8*b*, the vertical moving means lowers the first sucker unit 92 which, in turn, sucks the first sheet of light-sensitive material A and holds it in place; then, the first sucker unit 92 rises to hoist the first sheet of light-sensitive material A.

When the first sucker unit 92 rises, the belt conveyor 70 restarts to run and, at the same time, the motor 134 runs to rotate the pivoting member 142 counterclockwise and, as shown in FIG. 8*c*, the first sucker unit 92 moves downstream to the right and transports the first sheet of light-sensitive material A whereas the second sucker unit 94 moves to the home position (as shown in FIG. 4).

When these movements of the first and second sucker units end, the belt conveyor 70 stops and the first sucker unit 92 lowers to release the first sheet of light-sensitive material A so that it is replaced on the belt conveyor 70; thereafter, the first sucker unit 92 rises and the belt conveyor 70 starts to run.

When the second sheet of light-sensitive material A is transported to the home position, the belt conveyor 70 stops and, as shown in FIG. 8*d*, the second sucker unit 94 lowers to suck the second sheet of light-sensitive material A; the second sucker unit 94 then rises and the belt conveyor 70 starts to run.

Subsequently, the motor 34 runs to rotate the pivoting member 142 clockwise and, as shown in FIG. 8*e*, the second sucker unit 94 moves downstream to the left and transports the second sheet of light-sensitive material A, whereas the first sucker unit 92 moves to the home position.

When these movements of the first and second sucker units end, the belt conveyor 70 stops and the second sucker unit 94 lowers to release the second sheet of light-sensitive material A and replace it on the belt conveyor 70; the second sucker unit 94 then rises and the belt conveyor 70 starts to run and, as shown in FIG. 8*f*, the third sheet of light-sensitive material A is transported to the home position.

When the third sheet of light-sensitive material A is transported to the home position, the belt conveyor 70 stops and, as shown in FIG. 8*g*, the first sucker unit 92 sucks the third sheet in place and rises, whereupon the belt conveyor 70 starts to run; then, as shown in FIG. 8*h*, the pivoting member 142 rotates counterclockwise and the first sucker unit 92 transports the third sheet downstream to the right, whereas the second sucker sheet 94 moves to the home position.

The subsequent steps are briefly shown in FIGS. 8*i*–8*k*, in which in accordance with the transport of successive sheets of the light-sensitive material A to their home position, the belt conveyor 70 makes stops and restarts, the respective sucker units move, suck the sheets of light-sensitive material A and release them so that the process of setting aside one sheet to the right and the next sheet to the left is repeated to eventually distribute all sheets of the light-sensitive material A into two rows. As in the case of three-row distribution, the difference in travelling speed between the belt conveyor 70 and the transport roller pair 48 will cause successive sheets of the light-sensitive material A to overlap after they have entered the processor 50.

As will be apparent from the foregoing description, the light-sensitive material distributing method of the invention and the invention device for implementing it using two sucker units that hoist and transport sheets of the light-sensitive material. These sucker units are alternatively put into action in such a way that transport of the first sheet with one sucker unit is simultaneously accompanied by movement of the other sucker unit to the home position, thus making the necessary preparation for sucking the next transported sheet in place; in addition, the first coming sheet of light-sensitive material A has been hoisted for distribution purposes and will in no way interface with the transport of the next coming sheet onto the belt conveyor 70. What is more, the two sucker units lift individual sheets of the light-sensitive material A from the belt conveyor 70 and carry them in the lateral direction to set them aside to either right or left; hence, sheets of the light-sensitive material A can be rapidly distributed (or transported for their distribution) without being constrained by the travelling speed of the belt conveyor 70 and other factors.

As a result, even if successive sheets of the light-sensitive material A need be distributed rapidly and continuously in order to meet strict requirements such as exposing one sheet in about two seconds, the incoming sheets can be accepted in succession without affecting transport of the light-sensitive material for scanning and other operations to be performed in zones upstream of the distributing device and the successive sheets can be distributed into two or three rows in a rapid and positive manner before entry into the processor 50.

In addition, to accomplish the distribution of sheets of the light-sensitive material A using the two sucker units, the distributing device of the invention employs only one motor and a simple mechanism using sucker unit guiding plates and two paddles; as a further advantage, the width of distribution can be easily changed by controlling the drive of the motor.

Another feature of the illustrated case is using the belt conveyor as transport means.

The belt conveyor 70 transports the light-sensitive material A as it is placed thereon. On the other hand, the scanning transport means 42 and the transport roller pair 48 which feeds the light-sensitive material A into the processor 50 (or the transport means in the processor 50) typically transports the light-sensitive material A as it is held between two members.

Therefore, even if part of the light-sensitive material A in the process of exposure is ejected from the scanning transport means 42 to be replaced on the belt conveyor 70, the transport speed of the light-sensitive material A is governed by the scanning transport means 42 and any difference that may occur between the travelling speed of the belt conveyor 70 and the scanning transport speed will in no way affect the speed at which the light-sensitive material A being exposed is transported for scanning; hence, the distributing device 18 can be provided immediately after the scanning transport means 42.

If the light-sensitive material A is released from the scanning transport means 42, it is transported by the belt conveyor 70 at the travel speed thereof to be fed through the transport roller pair 48. The travelling speed of the transport roller pair 48 which performs entry of the light-sensitive material A into the processor is equal to the transport speed in the processor 50 and typically slower than the travelling speed of the belt conveyor 70 and the like in the recording apparatus 10. However, if the transport of the light-sensitive material A to the transport roller pair 48 is performed by the belt conveyor 70, its transport speed at the point of time when it has been held between the two members of the transport roller pair 48 is governed by that roller pair and, hence, the exposed light-sensitive material A can be supplied into the processor 50 in a smooth and safe manner.

Briefly, the illustrated distributing device 18 is such that the belt conveyor 70 for transporting the light-sensitive material A as it is placed thereon is combined with the lift transport means which lifts individual sheets of the light-sensitive material and distributes them into a plurality of rows on the belt conveyor 70. As a result, the heretofore required high-speed transport section and speed-regulating section are obviated and the distributing device is generally straight and of short length in the transport path to realize a smaller size, a simpler construction at a lower cost. This device can transport the light-sensitive material A from the recording section 16 to the processor 50 in a smooth and consistent manner without affecting the transport of the light-sensitive material A for scanning and its transport through the processor 50 and, what is more, individual sheets of the light-sensitive material A can be rapidly and positively distributed into a plurality of rows as they travel from the recording section 16 to the processor 50.

In the cases described above, the suction and release of the light-sensitive material A by means of the sucker units are performed with the belt conveyor 70 brought to a stop in order to ensure more positive operations. However, this is not the sole case of the invention and, if mechanism permits, the belt conveyor 70 may keep running when the light-sensitive material A is sucked or released.

As already mentioned, the transport by the belt conveyor 70 is faster than that by the transport roller pair 48 which performs entry of the light-sensitive material into the processor. In the foregoing cases, this speed difference is sufficient to ensure that successive sheets of the light-sensitive material A entering the processor 50 will overlap satisfactorily and, hence, there is no need to ensure that the sheets of the light-sensitive material A being distributed into a plurality of rows will overlap.

Nevertheless, the greater the overlap of the sheets of the light-sensitive material A that are transported through the processor 50, the higher the throughput of the processor 50. Therefore, the distributing device 18 may be adapted to be such that the sheets of the light-sensitive material A already overlap at the point of time when they have been distributed into a plurality of rows on the belt conveyor 70.

Whichever the case, if finished prints (sheets of the light-sensitive material A that have been developed, dried and otherwise treated) emerge from the processor 50 in such a way that the distance between two consecutive sheets (as measured between their trailing edges if they emerge from the processor 50 as they are held between nip rollers or other pinching means) is too small, it may be difficult to stack the prints in the order of exposure depending on factors such as the composition of the stacker or sorter. Hence, this possibility has to be considered when distributing sheets of the light-sensitive material A into a plurality of rows by means of the distributing device 18.

In the distributing device of the invention, the means of moving the sucker units and so forth are in no way limited to the illustrated case and various other mechanisms can be employed as long as they can pick up sheets of the light-sensitive material A from the belt conveyor, transport them and distribute them into a plurality of rows. For example, two sucker units may be equipped with independent moving mechanisms to distribute the sheets of the light-sensitive material. In addition, the sucker units can be moved both horizontally and vertically by various known methods, such as means of using links, means of using cams, means of using guide rails and pipes, means of using gears, means of using a rack-and-pinion, wrapping connector driving or cylinders, as well as suitable combinations of these means.

In the illustrated case, exposure is performed on a center referenced basis and, accordingly, the two sucker units transport successive sheets of the light-sensitive material in opposite directions. It should, however, be noted that if exposure is performed on an edge referenced basis, the sheets of the light-sensitive material may be distributed with them being transported in the same direction by means of the two sucker units.

It should also be mentioned that not all kinds of light-sensitive material need be distributed in the distributing device 18; if the width of the processor 50 and other design factors are such that sheets larger than a certain size cannot be processed in a plurality of rows or in the case of performing batchwise rather than continuous processing, the successive sheets need not be distributed but may simply be fed into the processor 50 in a single row. In other cases such as processing a mixture of panoramic and L sizes, the distributing device 18 may be controlled in such a way that sheets of a panoramic size are not distributed but simply passed straight.

Further in addition, various modes of distribution may be adopted depending upon such factors as the width of the belt conveyor, the distance it transports the light-sensitive material and the width of the processor; for example, sheets of an L size may be distributed in two rows, sheets of 102–152 inch sizes may be distributed in three rows or even larger sized sheets may be distributed into a plurality of rows.

As already mentioned, the sheets of light-sensitive material A transported by the distributing device 18 are further transported by the transport roller pair 48 into the processor 50, where they are subjected to the necessary steps of processing including color development, bleach-fixing and rinsing, and thereafter dried to produce finished prints, which emerge from the processor.

While the light-sensitive material distributing method and device of the invention have been described above in detail, it should be noted that the invention is by no means limited to the foregoing cases and various improvements and modifications may course be made without departing from the scope and spirit of the invention. For example, in the illustrated case, exposed sheets of the light-sensitive material are distributed; however, if the image recording section is of a special type such as one capable of exposing a plurality of sheets simultaneously, unexposed sheets of the light-sensitive material may be distributed into a plurality of rows by means of the distributing device of the invention that implements the distributing method of the invention.

What is claimed is:

1. A method of distributing sheets of light-sensitive material having a specified length for use in an image recording apparatus that performs exposure to form a latent image on the sheets of light-sensitive material and which feeds the exposed sheets of light-sensitive material into a developing machine, wherein the sheets of light-sensitive material are distributed in a lateral direction perpendicular to their transport through said developing machine to form a plurality of rows, said method using two distributing units that lift the sheets of light-sensitive material and transport said sheets in said lateral direction, and said two distributing units being alternately put into action to distribute the sheets of light-sensitive material into a plurality of rows.

2. The method according to claim 1, wherein the exposure of the sheets of light-sensitive material is referenced to their center and wherein said two distributing units transport the sheets of light-sensitive material in opposite directions and alternately to distribute the sheets into two rows, or three rows one of which is provided by simply passing the sheets straight without activating either of the two distributing units.

3. The method according to claim 1, wherein the exposure of the sheets of light-sensitive material is scan exposure that is performed as said sheets of light-sensitive material are transported by scan transport means and wherein the sheets of light-sensitive material are distributed on a belt conveyor located immediately downstream of said scan transport means.

4. A distributing device comprising two lift units that each hold and lift a sheet of light-sensitive material, a substrate having guide means that engage the respective lift units to guide the lift units in oblique directions in which the lift units progressively depart from each other, two paddle plates that are supported on said substrate in such a way that the paddle plates are pivotal about a common center shaft positioned inward of said guide means and each of which engages either one of said lift units, an urging means that urges said two paddle plates in directions in which the paddle plates approach each other, and a drive means of pivoting one of said paddle plates to depart from the other paddle plate.

5. The device according to claim 4, wherein said guide means guide the respective lift units in symmetric oblique directions and the center shaft for said two paddle plates is positioned on a center line with respect to which said oblique directions are symmetrical.

6. The device according to claim 4, wherein each of said lift units holds and lifts the sheet of light-sensitive material from the belt conveyor, moves the sheet in one of said oblique directions and replaces the sheet on the belt conveyor.

* * * * *